US012587748B2

(12) United States Patent
Geissler et al.

(10) Patent No.: US 12,587,748 B2
(45) Date of Patent: Mar. 24, 2026

(54) CAMERA CONTROLLER PROVIDING A CAMERA CONTROL SIGNAL FOR COMMANDING MOVEMENT OF A CAMERA

(71) Applicant: Mo-Sys Engineering Limited, London (GB)

(72) Inventors: Michael Paul Alexander Geissler, London (GB); Danny Zemanek, Redwood City, CA (US)

(73) Assignee: Mo-Sys Engineering Limited, London (GB)

( * ) Notice: Subject to any disclaimer, the term of this patent is extended or adjusted under 35 U.S.C. 154(b) by 93 days.

(21) Appl. No.: 18/683,169

(22) PCT Filed: Aug. 12, 2022

(86) PCT No.: PCT/GB2022/052117
§ 371 (c)(1),
(2) Date: Feb. 12, 2024

(87) PCT Pub. No.: WO2023/017285
PCT Pub. Date: Feb. 16, 2023

(65) Prior Publication Data
US 2024/0380978 A1 Nov. 14, 2024

(30) Foreign Application Priority Data

Aug. 13, 2021 (GB) ...................................... 2111681

(51) Int. Cl.
*H04N 23/695* (2023.01)

(52) U.S. Cl.
CPC .................................. *H04N 23/695* (2023.01)

(58) Field of Classification Search
CPC ..................................................... H04N 23/695
See application file for complete search history.

(56) References Cited

U.S. PATENT DOCUMENTS

| | | | |
|---|---|---|---|
| 2004/0189802 A1* | 9/2004 | Flannery | ............. H04N 23/635 |
| | | | 348/E5.043 |
| 2020/0114767 A1 | 4/2020 | Drake | |
| 2023/0353861 A1* | 11/2023 | Nordquist | ........... H04N 23/661 |

OTHER PUBLICATIONS

International Search Report for PCT Application No. PCT/GB2022/052117, mailed Dec. 8, 2022.
International Preliminary Report on Patentability for PCT Application No. PCT/GB2022/052117, mailed Feb. 13, 2024.

* cited by examiner

*Primary Examiner* — Christopher K Peterson
(74) *Attorney, Agent, or Firm* — Andrus Intellectual Property Law, LLP

(57) ABSTRACT

A camera controller for providing a camera control signal for commanding movement of a camera, the camera controller comprising: an input device, the input device being capable of sensing input position over a range of motion; and an electronic circuit for receiving sensed input position from the input device and forming the camera control signal, the circuit being arranged to form the camera control signal according to one of a plurality of control laws and to select independence on the sensed input position the control law to be used.

8 Claims, 2 Drawing Sheets

CAMERA CONTROLLER PROVIDING A CAMERA CONTROL SIGNAL FOR COMMANDING MOVEMENT OF A CAMERA

CROSS-REFERENCE TO RELATED APPLICATIONS

This application is the U.S. national stage application of International Application No. PCT/GB2022/052117, filed on Aug. 12, 2022, which international application was published on Feb. 16, 2023, as International Publication WO 2023/017285 A1 in the English language. The international application is incorporated herein by reference, in its entirety. The international application claims priority from European Patent Application No. 2111681.9, filed on Aug. 13, 2021, which is incorporated herein by reference, in its entirety.

This invention relates to user interfaces for controlling a camera to swing across a scene. Interfaces of this type may be used to move a selected sub-region across a video scene, and for other purposes.

When still or video images are being captured by a camera, it is known for the camera to be mounted on a motion head. The head may permit the camera to pan (to rotate about a vertical or roughly vertical axis) and to tilt (to rotate about a horizontal or roughly horizontal axis). The head may be provided with a drive mechanism, such as motors, which can drive motion in pan and tilt. This can allow a camera operator to control from a remote station the direction in which the camera is directed. Typically a joystick is provided and the system is responsive to motion of the joystick in one axis to cause pan and in another axis to cause tilt.

Sometimes a video stream is captured whose field of view is larger than the field of view that it is desired to present to a final viewer. An operator may then select a sub-region of the captured video stream to form the final video stream. The location of the sub-region in the field of view of the captured video stream may change during the course of the video, as a subject moves in the captured stream. To select the location of the sub-region an operator may again use a user input device such as a joystick to effectively pan and tilt the location of the sub-region. When the operator provides a panning input the sub-region is caused to move roughly horizontally in the captured videostream. When the operator provides a tilting input the sub-region is caused to move roughly vertically in the captured video stream. Combinations are possible. A similar user interface as is used to directly control a camera may be used to select the sub-region. Users can find this intuitive because the motion of the sub-region is analogous to the pan and tilt of an actual camera.

The motion head may be capable of a wide range of movement. For example it may be capable of up to 360 degrees of rotation in pan and potentially close to 180 degrees of rotation in tilt. To exploit the full range of motion of the motion head, the full range of motion of the control device (e.g. joystick) can be mapped to the full range of motion of the motion head. However this has some disadvantages. First, it may result in relatively insensitive motion because a small movement of the input device corresponds to a relatively large movement of the motion head. Second, it can be inconvenient to set the system up in this way because the ranges of motion ofthejoystickandthemotion-headmayneedtobeknownandmappedtoeachother.

A further issue arises near the centre of motion of the control device. If the control device is equipped with a spring for returning it to its centre position, it is difficult to ensure that the spring will return the control device to the exact centre position. To cope with this it is known to define a dead zone near the centre position. In the dead zone movement of the control device has no effect on the motion head. But a dead zone can be undesirable to an operator because it can make motion of the camera feel jerky.

There is a need for an improved design of controller of the type suitable for controlling a camera in pan and tilt.

According to one aspect there is provided a camera controller for providing a camera control signal for commanding movement of a camera, the camera controller comprising; an input device, the input device being capable of sensing input position over a range of motion; and an electronic circuit for receiving sensed input position from the input device and forming the camera control signal, the circuit being arranged to form the camera control signal according to one of a plurality of control laws and to select in dependence on the sensed input position the control law to be used.

One of the control laws may be a positional control law.

The other of the control laws may be a velocity control law.

Theelectroniccircuitmaybeconfiguredtoapplytheposition-alcontrollawby forming the camera control signal so as to control motion of the camera in proportion to motion of the sensed input position.

The electronic circuit may be configured to apply the velocity control law by forming thecameracontrolsignal-soastocontrolmotionofthecamerainproportionto velocity of motion of the sensed input position.

The electronic circuit may be configured to apply the positional control law when the sensed input position is in an inner part of the range of motion and to apply the velocity control law when the sensed input position is in an outer part of the range of motion.

The outer part of the range of motion may surround the inner part of the range of motion.

The input device may comprise a housing and a user input element movable relative to the housing and the input device may be configured to sense the position and/or angle of the user input element relative to the housing to form the said input position.

The input device may be touch-sensitive.

The input device may be configured to sense the position of a touch on the input device to form the said input position.

The input device may be configured to sense the input position on two axes. The electronic circuit may be configured to form the camera control signal on two axes each corresponding to a respective one of the axes of the input device.

The camera control signal may be configured to control a camera mount to move the camera in two of pan, tilt, sway and heave.

The camera controller may be coupled to a camera mount for control of the camera mount in response to the camera control signal.

The control signal may comprise a first channel defining commanded camera position on a first axis and a second channel defining commanded camera position on a second axis. The electronic circuit may be configured to form an output on each channel in accordance with a selected control law, each control law taking as input the sensed input position or the rate of change thereof.

The present invention will now be described by way of example with reference to the accompanying drawings. In the drawings.

Figure 1:
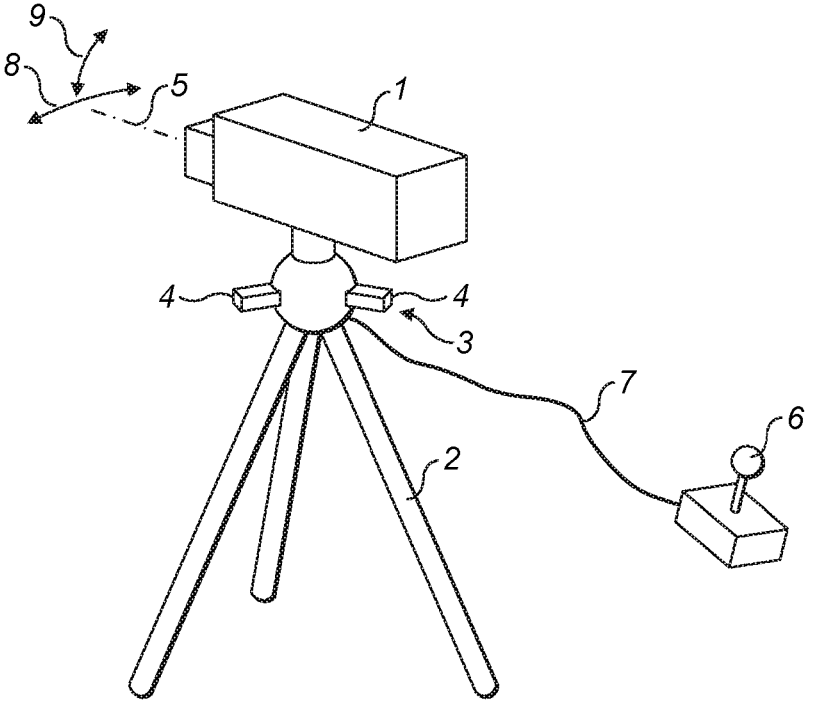
FIG. 1 shows a motion controller and a camera mounted on a motion head.

FIG. 1 shows a camera 1 mounted on a stand or tripod 2 by a motion head 3. The motion head has motors 4 that can drive the camera to rotate in pan 8 and tilt 9 senses. Such rotation alters the direction 5 in which the camera is facing. A joystick 6 is coupled to the motion head 3 by a cable 7. The system is arranged so that when an operator moves the joystick the motors 4 will move the head in pan or tilt. In the examples described below, the camera rotates in pan and tilt senses. However, the camera is not limited to motion in these two axes. For example, motors 4 may adjust the roll of the camera and/or the elevation of the camera, in addition to or alternatively to the pan and/or tilt of the camera.

In the present system the joystick, and the motors' response to it, are arranged with the intention of improving the responsiveness of the system as perceived by an operator and of improving the ease of setting the system up, as will be described below. The joystick 6 could be replaced by other controllers having two or more degrees of freedom.

Figure 2:
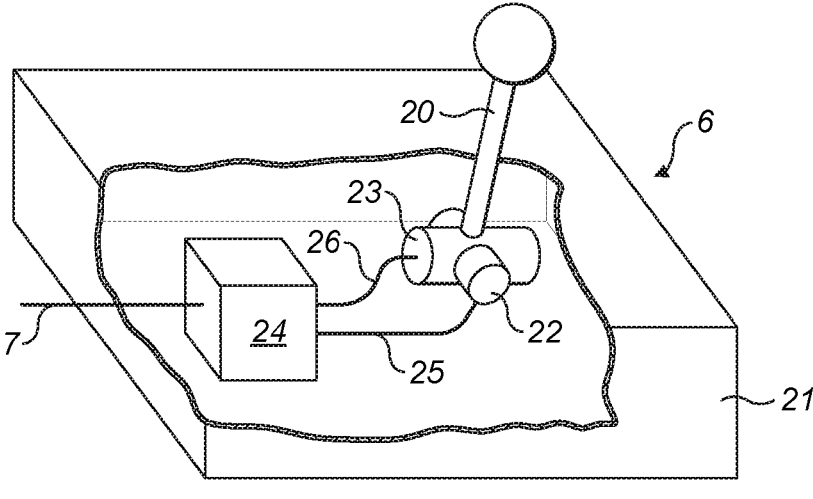
FIG. 2 is a cut-away view of a user input device.

FIG. 2 is a cut-away view of a user input device suitable for serving as the joystick 6 of FIG. 1. The user input device comprises a user input lever 20 and a housing 21. The lever is mounted to the housing so that it can rotate relative to the housing about two revolute joints having orthogonal rotation axes. Rotational position sensors 22, 23 sense the rotational position of the lever about both those axes. The outputs of the rotation sensors are passed to an encoder 24. The encoder may be provided by an electronic circuit. The encoder may be embodied in dedicated hardware or as a processor together with memory storing in non-transient form code executable by the processor to perform the functions described of it herein. The encoder receives inputs from the rotational position sensors and forms in dependence on those inputs an output to cable 7 which is suitable for controlling the motors 4 independence on the rotational position of the lever 20 relative to the housing 21. The relationship between (i) the inputs at 25, 26 from the rotation sensors 22, 23 respectively and (ii) the output at 7 will be discussed further below.

The output at 7 is of a form suitable for controlling the motors 4 in a desired way. The output at 7 may directly power the motors, or it may comprise data that commands the motors, with the motors being powered from a power supply local to the motion head 3.

The motors 4 provide rotation about two axes. As mentioned above, the motors 4 may provide rotation about more than two axes. For example, the motors 4 may cause the camera to roll. In the example shown in FIG. 2, the encoder 24 commands one of the motors in response to movement of the lever about the axis of one of the rotation sensors 22, 23 and commands the other of the motors in response to movement of the lever about the axis of the other of the rotation sensors.

The encoder 24 may be capable of forming the command signals to the motors according to two laws: a position law and a velocity law. When a position law is in force, the angular rotation commanded of a motor is proportional to the angular rotation applied to the lever about the corresponding axis. Thus, if the angular position of the head about one of its axes is initially $a_1$ and the angular position of the control lever about the corresponding axis is initially $c_1$, and the control lever is then moved to a position $c_2$, the encoder commands the respective motor of the head to move to a position $a_2$ where $a_2 = a_1 + j(c_2 - c_1)$, where $j$ is a constant. The constant $j$ may be different in different position control laws. For example, a first position control law may multiply the difference between $c_2$ and $c_1$ by $j=50$. In another position control law, $j$ may be 1 or less than 1, for example. In the present example, $a_1$, $a_2$, $c_1$ and $c_2$ may be expressed in degrees of angle. When a velocity law is in force, the rate of change of angular rotation commanded of a motor is proportional to the angular position of the lever about the corresponding axis. Thus, if the null position of the lever about one of its axes is $c_0$ and the lever is then moved to position $c_2$, for the duration that the lever is in that position the encoder commands the corresponding motor to change the angular position of the head about the corresponding one of its axes at a rate equal to $k(c_2 - c_0)$. The constant $k$ may be different in different velocity control laws. For example, a first velocity control law may multiply the difference between $c_2$ and $c_0$ by $k=5$. In another velocity control law, $k$ may be 10, for example. Corresponding behaviour can be applied about the other axes, and about both axes simultaneously, depending on the position of the lever.

As mentioned above, the motor(s) may cause the camera to pan or tilt. The motor(s) may cause the camera to raise or lower its elevation and/or change the roll of the camera. The camera may be commanded to move in either or both of a rotational motion (e.g., controlling the tilt and/or roll of the camera) and a translational motion (e.g., controlling the pan of the camera and/or the vertical and/or transverse position of the camera).

As described above, the user input device may comprise a user input lever 20 that can rotate about two revolute joints in the above example. Rotational position sensors 22, 23 may sense the rotational position of the lever about both those axes. The encoder 24 commands one of the motors in response to movement of the lever about the axis of one of the rotation sensors 22, 23 and commands the other of the motors in response to movement of the lever about the axis of the other of the rotation sensors. In either case, whether the input lever is being rotated about one axis or the other (or both) in order to pan and/or tilt the camera, the encoder may form the command signals to the motors according to two laws, a position law and a velocity law. In other words, the camera may be commanded to move in any type of motion (e.g., rotational or translational) separately to the type of control law selected by the encoder. For example, as described above, the camera may be commanded to pan or tilt under a position control law, and pan or tilt under a velocity control law, depending on the sensed position of the input.

Alternatively, the type of motion (e.g., rotational or translational) of the camera to which the control law applies may be user selectable. For example, a first input device may have a fixed type of motion to which the control law applies. A second user input device, such as a rocker switch, may be provided to enable the user to select whether the first user input device is to control rotation or translation. The first input device may thus be capable of providing control with multiple control laws, in each case controlling a type of motion (rotation or translation) designated by another user input device.

If the encoder 24 commands position of the motors 4 directly then it may be helpful for the encoder to have closed loop control of the motors. In that way it can more accurately apply the velocity law without risk of the motors and the encoder's estimate of their states becoming separated.

There may be one or more motors. There may be one or more encoders. There may be one motor and/or one encoder axis of motion of the controller (e.g. lever). The axes may be orthogonal. There may be a total of two such axes.

Figure 3:
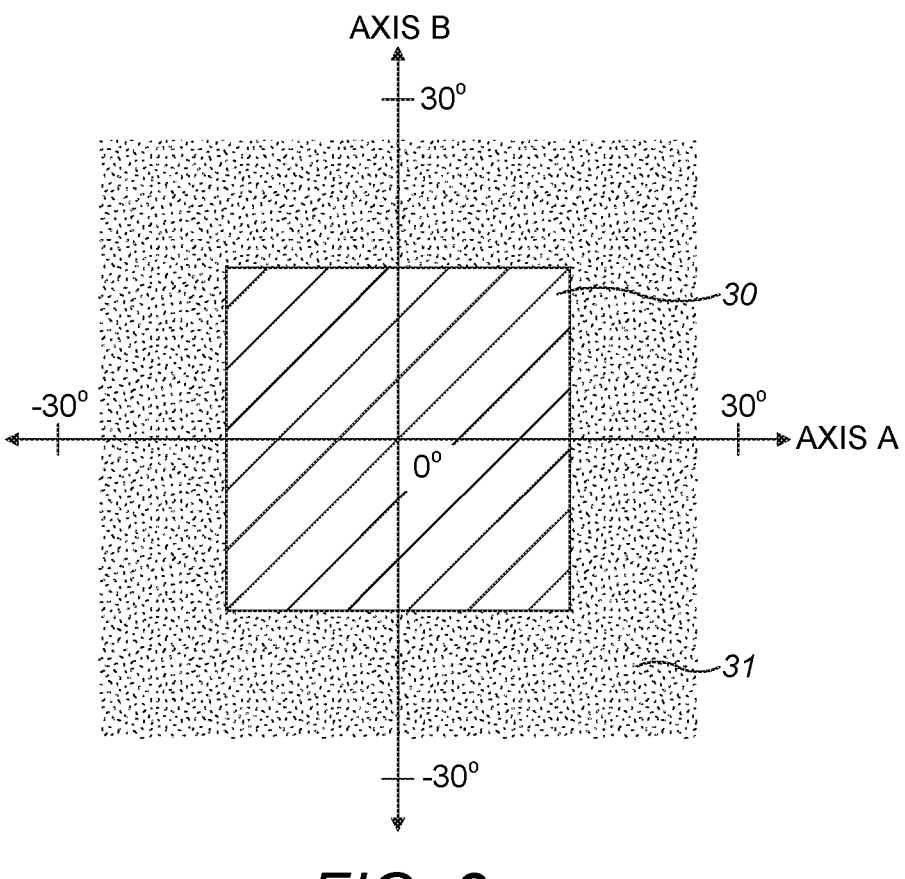
FIG. 3 illustrates a control regime.

In one arrangement, the encoder is arranged so that it applies the position law when the lever is in a central zone of its range of motion, and applies the velocity law when the lever is outside that central zone. This is illustrated in FIG. 3. In FIG. 3, axes A and B represent rotation about the two available rotation axes of the lever. The position law is applied when the lever is in the zone 30. The velocity law is applied when the lever is in the zone 31.

The boundary between the zones may be set in various ways. Some examples will be given.

1. The position law may be applied when about both of its rotation axes the absolute angular deviation of the lever from a reference position (e.g. the central position of its range of motion in each axis) is less than a predetermined value; and otherwise the velocity law may be applied. For example, if s represents the angular deviation of the lever from the reference position in one axis and t represents the angular deviation of the lever from the reference position in the other axis and u and v are constants (these definitions will continue to be used below), the logic may be represented as:

If $|s|<u$ and $|t|<v$ then apply position law

Otherwise apply velocity law

This is illustrated in FIG. 3.

2. The position law may be applied when a value that is positively dependent on the absolute angular deviations of the lever from a reference position in both axes exceeds a predetermined threshold. For example, the logic may be represented as:

If $|s|+|t|<u$ then apply position law

Otherwise apply velocity law

Other functions for combining s and t may be used.

3. Position and velocity laws may be applied independently in the two axis, depending on whether the angular position of the lever in the respective axis respective predetermined threshold. This logic may be represented as exceeds a For the axis in which s is determined:

If $|s|>u$ then apply position law for that axis Otherwise apply velocity law for that axis For the axis in which t is determined:

If $|t|>v$ then apply position law for that axis Otherwise apply velocity law for that axis 4. The transition between position and velocity laws may be blended. In a transition region the motion commanded of the head motors may be determined as a sum of a contribution determined according to position law and a contribution determined according to velocity law. In an extreme example, such blending could apply over the whole range of motion of the lever, with the emphasis on position law in a particular one of the axes, or both of the axes, being greater the closer the lever is to its reference position.

Under the velocity law the rate of change of the respective motor(s) is related to the difference between the lever's angular position and a null position. That null position may be at or in boundary between linear and velocity law, or may be a central position of the lever.

Thus, in one example, pseudo-code representing the operation of the encoder (which may operate using software and/or dedicated hardware) may be as follows:

```
x_threshold = threshold of law change in x
axisy_threshold= threshold of law change in y
axisj, k=configuration constants
```

6

-continued

```
Repeat:
    x_pos = x position of control
    levery_pas = y position of control
    leverif abs(x_pos)>x_threshold:
        control pan motor with velocity =
            k (x_pos − x_threshold (abs(x_pos)|x_pos))
    else:
        control pan motor to position= j. x_pos
    if abs(y_pos)>y_threshold:
        control tilt motor with velocity =
            k (y_pos − y_threshold (abs(y_pos)|y_pos))
    else:
        control tilt motor to position = j. y_pos
```

Other forms of logic are possible. Different j and k constants may be used for pan and tilt.

Instead of a rotatable lever, other forms of user interface are possible. One example is a user-engagable element, such as a puck, constrained to slide on a flat or curved plane. Instead of being from rotation sensors as described above, the inputs to the encoder would then be from positional sensors which sense the position of the element in two orthogonal axes. In an other example, the inputs could be from a touchpad. A user would then touch or drag a contact over the touchpad; sensors sense the position of the contact on the touchpad and the inputs to the encoder represent the contact position in two orthogonal axes. The control laws and their application would operate analogously.

The lever or other moveable control element may be biased, e.g. by a spring or other elastic element, to a neutral or central position.

The encoder need not be in housing 21. It could be in a separate unit or in the head 4. The encoder could be divided into two or more physical units.

The encoder need not communicate with the head by a wired connection. It could use a wireless data connection.

The system may operate as follows:

The user moves a control device, or provides a touch or gesture in a space having two or more dimensions or axes. Each of those axes will correspond to a freedom of motion of the camera. Each freedom of motion could be rotational or translational. For example, an input axis could correspond to a pan, tilt or linear travel motion of the camera, when it is mounted on a suitable support. An input axis may correspond to a roll of the camera.

One or more sensors sense the position of the control device, touch or gesture in each axis. By comparing that position with a previously sensed position and the time when that previously sensed position was sensed (which could be available implicitly to the system if the sensing occurs at regular intervals) the rate of movement of the control device, touch or gesture can be calculated.

Depending on the position of the control device, touch or gesture one of two or more control laws for the camera is selected. A first control law is a positional law. In the positional law the camera is commanded to move by an amount proportional to the amount of movement of the control input device, touch or gesture. For example, if the input device, control or gesture moves by an angle or distance u in one axis then the camera may be commanded to move on the corresponding axis by an angle or distance that is u multiplied by a predetermined constant. A second control law is a velocity law. In the velocity law the camera is commanded to move by an amount proportional to the rate of movement of the control input device, touch or gesture. For example, if the input device, control or gesture moves at an angular or linear rate v in one axis then the camera may be commanded to move on the corresponding axis by an angle or distance that is v multiplied by a predetermined constant.

As noted above, the law that is to be used is selected depending on the position of the control device, touch or gesture. The entire locus over which the device, touch or gesture can be sensed will be referred to as its range of motion. The first control law is selected when the device, touch or gesture is in an inner part of the range of motion, and the second control law is selected when the device, touch or gesture is in an outer part of the range of motion. The inner part may be surrounded by the second part. The inner part may comprise the centre of the range of motion. The device may be biased to the inner part. The outer part may comprise the periphery of the range of motion.

In the case where the type of motion of the camera is user selectable, the system may operate as follows:

A user selects, via a second input device, what type of motion of the camera a first user input device is to control. For example, the user may select that the first user input device controls the pan of the camera (as an example of a translational type of motion). As another example, the user may select that the first user input device controls the tilt of the camera (as an example of a rotational type of motion). The second input device may have four different buttons to select one of four different types of movement, for example.

Having selected a type of motion via the second input device, the user moves the first input device, or provides a touch or gesture in space on the first input device, in order to control the camera in the type of motion selected from the second input device.

One or more sensors sense the position of the first input device, touch or gesture.

By comparing that position with a previously sensed position and the time when that previously sensed position was sensed (which could be available implicitly to the system if the sensing occurs at regular intervals) the rate of movement of the first input device, touch or gesture can be calculated.

Depending on the position of the first input device, touch or gesture, one of two or more control laws for the camera is selected. A first control law is a positional law. In the positional law the camera is commanded to move by an amount proportional to the amount of movement of the first input device, touch or gesture. A second control law is a velocity law. In the velocity law the camera is commanded to move by an amount proportional to the rate of movement of the first input device, touch or gesture. In either control law, the type of motion of the camera is selected by the user via the second input device.

As noted above, the law that is to be used is selected depending on the position of the first input device, touch or gesture. The entire locus over which the device, touch or gesture can be sensed will be referred to as its range of motion. The first control law is selected when the device, touch or gesture is in an inner part of the range of motion, and the second control law is selected when the device, touch or gesture is in an outer part of the range of motion. The inner part may be surrounded by the second part. The inner part may comprise the centre of the range of motion. The device may be biased to the inner part. The outer part may comprise the periphery of the range of motion.

The first input device may thus be capable of providing control with multiple control laws, in each case controlling a type of motion (e.g., rotation or translation) designated by another user input device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The phrase "configured to" or "arranged to" followed by a term defining a condition or function is used herein to indicate that the object of the phrase is in a state in which it has that condition, or is able to perform that function, without that object being modified or further configured.

The invention claimed is:

1. A camera controller for providing a camera control signal for commanding movement of a camera, the camera controller comprising:

an input device comprising a housing, the input device being configured to sense a position and/or angle of a user input element which is movable relative to the housing to form a sensed input position; and an electronic circuit configured to receive the sensed input position from the input device and form the camera control signal, the electronic circuit being arranged to form the camera control signal according to one of a plurality of control laws and to select in dependence on the sensed input position the control law to be used, the plurality of control laws comprising a positional control law and a velocity control law, wherein the positional control law forms a camera control signal which commands the camera to move by an amount proportional to an amount moved by the user input element and the velocity control law forms a camera control signal which commands the camera to move with a velocity proportional to a rate of movement of the user input element.

2. The camera controller as claimed in claim 1, wherein the electronic circuit is configured to apply the positional control law when the sensed input position is in an inner part of the range of motion and to apply the velocity control law when the sensed input position is in an outer part of the range of motion.

3. The camera controller as claimed in claim 2, wherein the outer part of the range of motion surrounds the inner part of the range of motion.

4. The camera controller as claimed in claim 1, wherein the input device is touch-sensitive and the input device is configured to sense the position of a touch on the input device to form the said input position.

5. The camera controller as claimed in claim 1, wherein the input device is configured to sense the input position on two axes and the electronic circuit is configured to form the camera control signal on two axes each corresponding to a respective one of the axes of the input device.

6. The camera controller as claimed in claim 5, wherein camera control signal is configured to control a camera mount to move the camera in two of pan, tilt, sway and heave.

7. The camera controller as claimed in claim 1, coupled to a camera mount for control of the camera mount in response to the camera control signal.

8. The camera controller as claimed in claim 1, wherein the control signal comprises a first channel defining commanded camera position on a first axis and a second channel defining commanded camera position on a second axis, and the electronic circuit is configured to form an output on each channel in accordance with a selected control law, each control law taking as input the sensed input position or the rate of change thereof.

\* \* \* \* \*